(12) United States Patent
Bodinet

(10) Patent No.: US 9,922,682 B1
(45) Date of Patent: Mar. 20, 2018

(54) SYSTEMS AND METHODS FOR ORGANIZING VIDEO FILES

(71) Applicant: GOPRO, INC., San Mateo, CA (US)

(72) Inventor: Joshua Bodinet, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 15 days.

(21) Appl. No.: 15/183,679

(22) Filed: Jun. 15, 2016

(51) Int. Cl.
| | |
|---|---|
| H04N 9/80 | (2006.01) |
| G11B 27/34 | (2006.01) |
| G11B 27/00 | (2006.01) |
| G11B 20/00 | (2006.01) |
| G11B 27/30 | (2006.01) |
| G11B 27/029 | (2006.01) |

(52) U.S. Cl.
CPC ........ *G11B 27/34* (2013.01); *G11B 20/00007* (2013.01); *G11B 27/002* (2013.01); *G11B 27/029* (2013.01); *G11B 27/3081* (2013.01); *G11B 2020/00072* (2013.01)

(58) Field of Classification Search
CPC .......................... G11B 27/34; G11B 20/00007
See application file for complete search history.

(56) References Cited

U.S. PATENT DOCUMENTS

| | | |
|---|---|---|
| 6,633,685 B1 | 10/2003 | Kusama |
| 7,222,356 B1 | 5/2007 | Yonezawa |
| 7,483,618 B1 | 1/2009 | Edwards |
| 7,512,886 B1 | 3/2009 | Herberger |
| 7,885,426 B2 | 2/2011 | Golovchinsky |
| 7,970,240 B1 | 6/2011 | Chao |
| 8,180,161 B2 | 5/2012 | Haseyama |
| 8,396,878 B2 | 3/2013 | Acharya |
| 8,446,433 B1 | 5/2013 | Mallet |
| 8,606,073 B2 | 12/2013 | Woodman |
| 8,611,422 B1 | 12/2013 | Yagnik |

(Continued)

FOREIGN PATENT DOCUMENTS

| | | |
|---|---|---|
| JP | H09181966 A | 7/1997 |
| JP | 2005252459 A | 9/2005 |

(Continued)

OTHER PUBLICATIONS

PCT International Search Report and Written Opinion for PCT/US2015/023680, Oct. 6, 2015, 13 pages.

(Continued)

*Primary Examiner* — Hung Dang
*Assistant Examiner* — Girumsew Wendmagegn
(74) *Attorney, Agent, or Firm* — Sheppard Mullin Richter & Hampton LLP

(57) ABSTRACT

Electronic information defining visual content within video frames for playback may be accessed. The electronic information may be divided into electronic information parts defining separate temporal segments of the visual content. Headers may be generated and appended to the electronic information parts. The headers may include locators indicating locations of video frames in the electronic information parts. Two or more of the electronic information parts may be combined into combined electronic information. The combined electronic information may include a combine header. The combined header may include locators indicating locations of video frames in the combined electronic information.

18 Claims, 11 Drawing Sheets

(56) References Cited

U.S. PATENT DOCUMENTS

| | | |
|---|---|---|
| 8,612,463 B2 | 12/2013 | Brdiczka |
| 8,718,447 B2 | 5/2014 | Yang |
| 8,763,023 B1 | 6/2014 | Goetz |
| 8,774,560 B2 | 7/2014 | Sugaya |
| 8,971,623 B2 | 3/2015 | Gatt |
| 8,990,328 B1 | 3/2015 | Grigsby |
| 9,041,727 B2 | 5/2015 | Ubillos |
| 9,077,956 B1 | 7/2015 | Morgan |
| 9,142,257 B2 | 9/2015 | Woodman |
| 9,253,533 B1 | 2/2016 | Morgan |
| 9,342,376 B2 | 5/2016 | Jain |
| 9,396,385 B2 | 7/2016 | Bentley |
| 9,418,283 B1 | 8/2016 | Natarajan |
| 9,426,543 B1* | 8/2016 | Li .................. H04N 21/8586 |
| 2002/0165721 A1 | 11/2002 | Chang |
| 2004/0001706 A1 | 1/2004 | Jung |
| 2004/0128317 A1 | 7/2004 | Sull |
| 2005/0025454 A1 | 2/2005 | Nakamura |
| 2005/0108031 A1 | 5/2005 | Grosvenor |
| 2005/0198018 A1 | 9/2005 | Shibata |
| 2006/0080286 A1 | 4/2006 | Svendsen |
| 2006/0115108 A1 | 6/2006 | Rodriguez |
| 2007/0050517 A1* | 3/2007 | Doi .................. G11B 27/031 |
| | | 709/236 |
| 2007/0204310 A1 | 8/2007 | Hua |
| 2007/0230461 A1 | 10/2007 | Singh |
| 2008/0044155 A1 | 2/2008 | Kuspa |
| 2008/0123976 A1 | 5/2008 | Coombs |
| 2008/0152297 A1 | 6/2008 | Ubillos |
| 2008/0163283 A1 | 7/2008 | Tan |
| 2008/0177706 A1 | 7/2008 | Yuen |
| 2008/0183843 A1 | 7/2008 | Gavin |
| 2008/0253735 A1 | 10/2008 | Kuspa |
| 2008/0313541 A1 | 12/2008 | Shafton |
| 2009/0019995 A1 | 1/2009 | Miyajima |
| 2009/0125559 A1 | 5/2009 | Yoshino |
| 2009/0213270 A1 | 8/2009 | Ismert |
| 2009/0252474 A1 | 10/2009 | Nashida |
| 2010/0046842 A1 | 2/2010 | Conwell |
| 2010/0086216 A1 | 4/2010 | Lee |
| 2010/0104261 A1 | 4/2010 | Liu |
| 2010/0183280 A1 | 7/2010 | Beauregard |
| 2010/0199182 A1 | 8/2010 | Lanza |
| 2010/0231730 A1 | 9/2010 | Ichikawa |
| 2010/0245626 A1 | 9/2010 | Woycechowsky |
| 2010/0251295 A1 | 9/2010 | Amento |
| 2010/0274714 A1 | 10/2010 | Sims |
| 2010/0278504 A1 | 11/2010 | Lyons |
| 2010/0278509 A1 | 11/2010 | Nagano |
| 2010/0281375 A1 | 11/2010 | Pendergast |
| 2010/0281386 A1 | 11/2010 | Lyons |
| 2010/0318660 A1 | 12/2010 | Balsubramanian |
| 2011/0075990 A1 | 3/2011 | Eyer |
| 2011/0093798 A1 | 4/2011 | Shahraray |
| 2011/0103700 A1 | 5/2011 | Haseyama |
| 2011/0137156 A1 | 6/2011 | Razzaque |
| 2011/0170086 A1 | 7/2011 | Oouchida |
| 2011/0206351 A1 | 8/2011 | Givoly |
| 2011/0242098 A1 | 10/2011 | Tamaru |
| 2011/0293250 A1 | 12/2011 | Deever |
| 2012/0014673 A1 | 1/2012 | O'Dwyer |
| 2012/0027381 A1 | 2/2012 | Kataoka |
| 2012/0030029 A1 | 2/2012 | Flinn |
| 2012/0057852 A1 | 3/2012 | Devleeschouwer |
| 2012/0123780 A1 | 5/2012 | Gao |
| 2012/0141019 A1 | 6/2012 | Zhang |
| 2012/0210205 A1 | 8/2012 | Sherwood |
| 2012/0246114 A1 | 9/2012 | Edmiston |
| 2012/0283574 A1 | 11/2012 | Park |
| 2012/0311448 A1 | 12/2012 | Achour |
| 2013/0136193 A1 | 5/2013 | Hwang |
| 2013/0151970 A1 | 6/2013 | Achour |
| 2013/0166303 A1 | 6/2013 | Chang |
| 2013/0182166 A1 | 7/2013 | Shimokawa |
| 2013/0195429 A1 | 8/2013 | Fay |
| 2013/0197967 A1 | 8/2013 | Pinto |
| 2013/0208942 A1 | 8/2013 | Davis |
| 2013/0235071 A1 | 9/2013 | Ubillos |
| 2013/0239051 A1 | 9/2013 | Albouze |
| 2013/0259390 A1 | 10/2013 | Dunlop |
| 2013/0259399 A1 | 10/2013 | Ho |
| 2013/0282747 A1 | 10/2013 | Cheng |
| 2013/0283301 A1 | 10/2013 | Avedissian |
| 2013/0287214 A1 | 10/2013 | Resch |
| 2013/0300939 A1 | 11/2013 | Chou |
| 2013/0318443 A1 | 11/2013 | Bachman |
| 2013/0330019 A1 | 12/2013 | Kim |
| 2013/0343727 A1 | 12/2013 | Rav-Acha |
| 2014/0072285 A1 | 3/2014 | Shynar |
| 2014/0093164 A1 | 4/2014 | Noorkami |
| 2014/0096002 A1 | 4/2014 | Dey |
| 2014/0105573 A1 | 4/2014 | Hanckmann |
| 2014/0149865 A1 | 5/2014 | Tanaka |
| 2014/0152762 A1 | 6/2014 | Ukil |
| 2014/0161351 A1 | 6/2014 | Yagnik |
| 2014/0165119 A1 | 6/2014 | Liu |
| 2014/0169766 A1 | 6/2014 | Yu |
| 2014/0212107 A1 | 7/2014 | Saint-Jean |
| 2014/0219634 A1 | 8/2014 | McIntosh |
| 2014/0226953 A1 | 8/2014 | Hou |
| 2014/0232818 A1 | 8/2014 | Carr |
| 2014/0245336 A1 | 8/2014 | Lewis, II |
| 2014/0282661 A1 | 9/2014 | Martin |
| 2014/0300644 A1 | 10/2014 | Gillard |
| 2014/0328570 A1 | 11/2014 | Cheng |
| 2014/0334796 A1 | 11/2014 | Galant |
| 2014/0341528 A1 | 11/2014 | Mahate |
| 2014/0366052 A1 | 12/2014 | Ives |
| 2015/0015680 A1 | 1/2015 | Wang |
| 2015/0022355 A1 | 1/2015 | Pham |
| 2015/0029089 A1 | 1/2015 | Kim |
| 2015/0039646 A1 | 2/2015 | Sharifi |
| 2015/0067811 A1 | 3/2015 | Agnew |
| 2015/0071547 A1 | 3/2015 | Keating |
| 2015/0113009 A1 | 4/2015 | Zhou |
| 2015/0156247 A1 | 6/2015 | Hensel |
| 2015/0186073 A1 | 7/2015 | Pacurariu |
| 2015/0287435 A1 | 10/2015 | Land |
| 2015/0318020 A1 | 11/2015 | Pribula |
| 2015/0373281 A1 | 12/2015 | White |
| 2015/0375117 A1 | 12/2015 | Thompson |
| 2015/0382083 A1 | 12/2015 | Chen |
| 2016/0005440 A1 | 1/2016 | Gower |
| 2016/0026874 A1 | 1/2016 | Hodulik |
| 2016/0027470 A1 | 1/2016 | Newman |
| 2016/0027475 A1 | 1/2016 | Hodulik |
| 2016/0029105 A1 | 1/2016 | Newman |
| 2016/0055885 A1 | 2/2016 | Hodulik |
| 2016/0094601 A1 | 3/2016 | Besehanic |
| 2016/0103830 A1 | 4/2016 | Cheong |
| 2016/0189752 A1 | 6/2016 | Galant |
| 2016/0225405 A1 | 8/2016 | Matias |
| 2016/0225410 A1 | 8/2016 | Lee |
| 2016/0234345 A1 | 8/2016 | Roberts |
| 2016/0260000 A1 | 9/2016 | Yamakawa |
| 2016/0286235 A1 | 9/2016 | Yamamoto |
| 2016/0292881 A1 | 10/2016 | Bose |
| 2016/0358603 A1 | 12/2016 | Azam |
| 2016/0366330 A1 | 12/2016 | Boliek |

FOREIGN PATENT DOCUMENTS

| | | |
|---|---|---|
| JP | 2006053694 | 2/2006 |
| JP | 2006053694 A | 2/2006 |
| JP | 2008059121 A | 3/2008 |
| JP | 2009053748 A | 3/2009 |
| JP | 2011188004 | 9/2011 |
| JP | 2011188004 A | 9/2011 |
| WO | 2006001361 A1 | 1/2006 |
| WO | 2009040538 | 4/2009 |
| WO | 2012057623 | 5/2012 |

(56) References Cited

FOREIGN PATENT DOCUMENTS

WO 2012057623 A1 5/2012
WO 2012086120 A1 6/2012

OTHER PUBLICATIONS

Ernoult, Emeric, "How to Triple Your YouTube Video Views with Facebook", SocialMediaExaminer.com, Nov. 26, 2012, 16 pages.
PCT International Preliminary Report on Patentability for PCT/US2015/023680, dated Oct. 4, 2016, 10 pages.
PCT International Search Report for PCT/US15/23680 dated Aug. 3, 2015, 4 pages.
PCT International Search Report for PCT/US15/41624 dated Nov. 4, 2015, 5 pages.
PCT International Written Opinion for PCT/US2015/041624, dated Dec. 17, 2015, 7 Pages.
PCT International Search Report and Written Opinion for PCT/US15/12086 dated Mar. 17, 2016, 20 pages.
Schroff et al., "FaceNet: A Unified Embedding for Face Recognition and Clustering," IEEE Conference on Computer Vision and Pattern Recognition (CVPR), 2016, 10 pgs.
Parkhi et al., "Deep Face Recognition," Proceedings of the British Machine Vision, 2015, 12 pgs.
Iandola et al., "SqueezeNet: AlexNet-level accuracy with 50x fewer parameters and <0.5MB model size," arXiv:1602.07360, 2016, 9 pgs.
Ioffe et al., "Batch Normalization: Accelerating Deep Network Training by Reducing Internal Covariate Shift," arXiv:1502.03167, 2015, 11 pgs.
He et al., "Deep Residual Learning for Image Recognition," arXiv:1512.03385, 2015, 12 pgs.
Han et al., Deep Compression: Compressing Deep Neural Networks with Pruning, Trained Quantization and Huffman Coding, International Conference on Learning Representations 2016, 14 pgs.
Iandola et al., "SqueezeNet: AlexNet-level accuracy with 50x fewer parameters and <0.5MB model size", arXiv:1602.07360v3 [cs.Cv] Apr. 6, 2016 (9 pgs.).
Yang et al., "Unsupervised Extraction of Video Highlights Via Robust Recurrent Auto-encoders" arXiv:1510.01442v1 [cs.Cv] Oct. 6, 2015 (9 pgs).
Tran et al., "Learning Spatiotemporal Features with 3D Convolutional Networks", arXiv:1412.0767 [cs.Cv] Dec. 2, 2014 (9 pgs).
FFmpeg, "Demuxing," Doxygen, Dec. 5, 2014, 15 Pages, [online] [retrieved on Jul. 13, 2015] Retrieved from the internet <URL:https://www.ffmpeg.org/doxygen/2.3/group_lavf_encoding.html>.
FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.
FFmpeg, "AVPacket Struct Reference," Doxygen, Jul. 20, 2014, 24 Pages, [online] [retrieved on Jul. 13, 2015] Retrieved from the internet <URL:https://www.ffmpeg.org/doxygen/2.5/group_lavf_decoding.html>.
Nicole Lee, Twitter's Periscope is the best livestreaming video app yet; Mar. 26, 2015 URL:http://www.engadget.com/2015/03/26/periscope/ [Retrieved Aug. 25, 2015] 11 pages.
Japanese Office Action for JP Application No. 2013-140131, dated Aug. 5, 2014, 6 pages.
Office Action for U.S. Appl. No. 13/831,124, dated Mar. 19, 2015, 14 pages.
PSonar URL: http://www.psonar.com/about retrieved on Aug. 24, 2016, 3 pages.

* cited by examiner

SYSTEMS AND METHODS FOR ORGANIZING VIDEO FILES

FIELD

This disclosure relates to systems and methods that organize video files.

BACKGROUND

Video applications may allow a user to insert or remove video clips from video presentations. Inserting or removing video clips from video presentations may require rendering of video frames in video presentations. Rendering of video frames may be time consuming.

SUMMARY

This disclosure relates to organizing video files. Electronic information defining visual content within video frames for playback may be accessed. The electronic information may be divided into electronic information parts defining separate temporal segments of the visual content. Headers may be generated and appended to the electronic information parts. The headers may include locators indicating locations of video frames in the electronic information parts. Two or more of the electronic information parts may be combined into combined electronic information. The combined electronic information may include a combine header. The combined header may include locators indicating locations of video frames in the combined electronic information.

A system that organizes video files may include one or more physical processors and/or other components. The one or more physical processors may be configured by machine-readable instructions. Executing the machine-readable instructions may cause the one or more physical processors to facilitate organizing video files. The machine-readable instructions may include one or more computer program components.

In some aspects of the disclosure, the computer program components may include one or more of an access component, an divide component, a header component, an append component, and/or other computer program components. In some implementations, the computer program components may include a transmission component and/or other computer program components.

The access component may be configured to access electronic information and/or other information. The electronic information may be stored in a storage medium and/or in other locations. The electronic information may define visual content within video frames for playback. Visual content may refer to media content that may be observed visually. Visual content may include one or more videos stored in one or more formats/container, and/or other visual content. The electronic information may include a first video frame, a second video frame, and/or other video frames. The electronic information may include an original header. The original header may include one or more locators indicating locations of one or more video frames in the electronic information. The original header may include a first locator indicating location of the first video frame in the electronic information, a second locator indicating location of the second video frame in the electronic information, and/or other locators indicating locations of other video frames in the electronic information.

The divide component may be configured to divide the electronic information into two or more electronic information parts. The electronic information parts may define separate temporal segments of the visual content. The electronic information parts may include a first electronic information part, a second electronic information part, and/or other electronic information parts. The first electronic information part may include the first video frame and/or other video frames. The second electronic information part may include the second video frame and/or other video frames.

In some implementations, the electronic information may be divided into two or more electronic information parts based on instantaneous decoding refresh frames such that individual electronic information parts include individual instantaneous decoding refresh frames. The first electronic information part may include a first instantaneous decoding refresh frame. The second electronic information part may include a second instantaneous decoding refresh frame. In some implementations, the first electronic information part may include a first instantaneous decoding refresh group. The second electronic information part may include a second instantaneous decoding refresh group.

In some implementations, different instantaneous decoding refresh group may include a same number of video frames. The first instantaneous decoding refresh group and the second instantaneous decoding refresh group may include a same number of video frames. In some implementations, different instantaneous decoding refresh group may include different numbers of video frames. The first instantaneous decoding refresh group and the second instantaneous decoding refresh group may include different numbers of video frames.

In some implementations, individual instantaneous decoding refresh group may include different sets of video frames. The first instantaneous decoding refresh group may include a first set of video frames. The first set of video frames may not refer to video frames preceding the first instantaneous decoding refresh frame. The second instantaneous decoding refresh group may include a second set of video frames. The second set of video frames may not refer to video frames preceding the second instantaneous decoding refresh frame.

The header component may be configured to generate headers for the electronic information parts. The headers may include locators indicating locations of video frames in the electronic information parts. A first header may include a locator indicating location of the first video frame in the first electronic information part and/or other locators indicating locations of other video frames in the first electronic information part. A second header may include a locator indicating location of the second video frame in the second electronic information part and/or other locators indicating locations of other video frames in the second electronic information part.

In some implementations, one or more locators may include one or more file offsets. The locators of the first header may include a file offset indicating location of the first video frame in the first electronic information part. The locators of the second header may include a file offset indicating location of the second video frame in the second electronic information part.

The append component may be configured to append the headers to the electronic information parts. The first header may be appended to the first electronic information part. The second header may be appended to the second electronic information part.

The transmission component may be configured to effectuate transmission of one or more electronic information parts. One or more electronic information parts may be transmitted to one or more client computing platforms and/or other computing devices. One or more client computing platforms may be associated with one or more users. The transmission component may effectuate transmission of one or more electronic information parts based on one or more user commands. The transmission component may, responsive to a first user command, effectuate transmission of the first electronic information part to a client computing platform associated with a user at a first time. The transmission component may, responsive to a second user command, effectuate transmission of the second electronic information part to the client computing platform associated with the user at a second time. The second time may be subsequent to the first time.

In some aspects of the disclosure, the computer program components may include one or more of a receive component, a combine component, and/or other computer program components. In some implementations, the computer program components may include a remove component and/or other computer program components.

The receive component may be configured to receive one or more electronic information parts and/or other information. The electronic information parts may define separate temporal segments of visual content within video frames for playback. The electronic information parts may include a first electronic information part, a second electronic information part, and/or other electronic information parts. The first electronic information part may include a first video frame and/or other video frames. The second electronic information part may include a second video frame and/or other video frames. In some implementations, the electronic information parts may include a third electronic information part. The third electronic information part may include a third video frame and/or other video frames.

The electronic information parts may include headers. The header may include locators indicating locations of video frames in the electronic information parts. The first electronic information part may include a first header. The first header may include a locator indicating location of the first video frame in the first electronic information part and/or other locators indicating locations of other video frames in the first electronic information part. The second electronic information part may include a second header. The second header may include a locator indicating location of the second video frame in the second electronic information part and/or other locators indicating locations of other video frames in the second electronic information part. In some implementations, the third electronic information part may include a third header. The third header may include a locator indicating location of the third video frame in the third electronic information part and/or other locators indicating locations of other video frames in the third electronic information part. In some implementations, one or more locators may include one or more file offsets.

In some implementations, the electronic information parts may be divided from electronic information stored in a storage medium. The electronic information parts may be divided from the electronic information based on instantaneous decoding refresh frames such that individual electronic information parts include individual instantaneous decoding refresh frames. The first electronic information part may include a first instantaneous decoding refresh frame. The second electronic information part may include a second instantaneous decoding refresh frame. In some implementations, the first electronic information part may include a first instantaneous decoding refresh group. The second electronic information part may include a second instantaneous decoding refresh group.

In some implementations, different instantaneous decoding refresh group may include a same number of video frames. The first instantaneous decoding refresh group and the second instantaneous decoding refresh group may include a same number of video frames. In some implementations, different instantaneous decoding refresh group may include different numbers of video frames. The first instantaneous decoding refresh group and the second instantaneous decoding refresh group may include different numbers of video frames.

In some implementations, the receive component may receive one or more electronic information parts at different times. The first electronic information part may be received at a first time. The second electronic information part may be received at a second time. The second time may be subsequent to the first time. In some implementations, the first electronic information part may be received in response to a first user command. The second electronic information part may be received in response to a second user command. In some implementations, the third electronic information part may be received at a third time. The third time may be subsequent to the second time.

The combine component may be configured to generate one or more combined electronic information. The combine component may generate a first combined electronic information. The first combined electronic information may include the first electronic information part, the second electronic information part, and/or other electronic information parts. The first combined electronic information may include a first combined header. The first combined header may include locators indicating locations of video frames in the first combined electronic information. The first combined header may include a locator indicating location of the first video frame in the first combined electronic information, a locator indicating location of the second video frame in the first combined electronic information, and/or other locators indicating locations of other video frames in the first combined electronic information.

In some implementations, the combine component may be configured to generate a second combined electronic information. The second combined electronic information may include the first electronic information part, the second electronic information part, the third electronic information part, and/or other electronic information parts. The second combined electronic information may include a second combined header. The second combined header may include locators indicating locations of video frames in the second combined electronic information. The second combined header may include a locator indicating location of the first video frame in the second combined electronic information, a locator indicating location of the second video frame in the second combined electronic information, a locator indicating location of the third video frame in the second combined electronic information, and/or other locators indicating locations of other video frames in the second combined electronic information. In some implementations, the second combined electronic information may not include the first combined header.

The remove component may be configured to remove one or more electronic information parts from one or more combined electronic information. The remove component may remove one or more electronic information parts from the second combined electronic information, and/or other combined electronic information. The remove component may modify the second combined header. The second combined header may be modified to remove one or more locators corresponding to the removed electronic information parts.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1A:
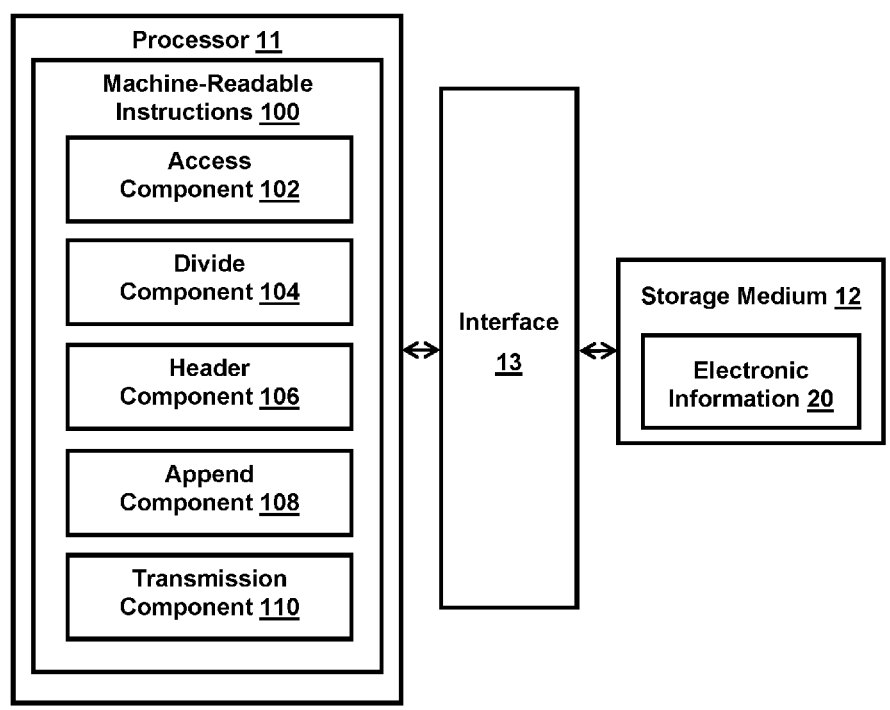
FIGS. 1A-1B illustrate systems for organizing video files.
Figure 1B:
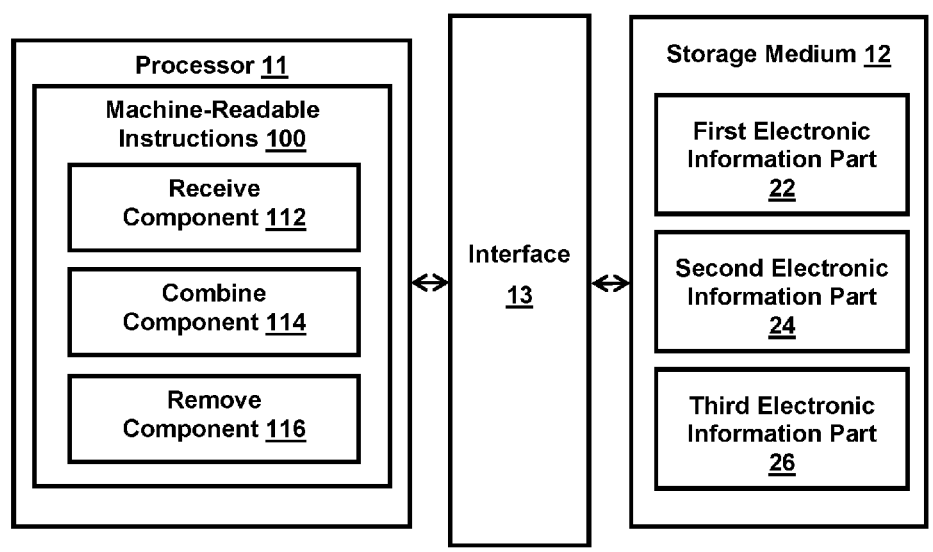

FIGS. 1A-1B illustrate systems 10A-10B for organizing video files. Systems 10A-10B may include one or more of processor 11, storage medium 12, interface 13 (e.g., bus, wireless interface, etc.), and/or other components. Electronic information 20 defining visual content within video frames for playback may be accessed by processor 11. Electronic information 20 may be divided into electronic information parts defining separate temporal segments of the visual content. Headers may be generated and appended to the electronic information parts. The headers may include locators indicating locations of video frames in the electronic information parts. Two or more of the electronic information parts may be combined into combined electronic information. The combined electronic information may include a combine header. The combined header may include locators indicating locations of video frames in the combined electronic information.

Storage medium 12 may include electronic storage medium that electronically stores information. Storage medium 12 may store software algorithms, information determined by processor 11, information received remotely, and/or other information that enables systems 10A-10B to function properly. For example, storage medium 12 may store information relating to electronic information, electronic information parts, headers, locators, dividing electronic information, combining electronic information, and/or other information. Systems 10A-10B may include electronic storage separate from storage medium 12. Electronic storage separate from storage medium 12 may perform one or more of the functionalities of storage medium 12 discussed above.

Processor 11 may be configured to provide information processing capabilities in systems 10A-10B. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine-readable instructions 100 to facilitate organizing video files. Machine-readable instructions 100 may include one or more computer program components.

In some aspects of the disclosure, as shown in FIG. 1A, machine-readable instructions 100 may include one or more of access component 102, divide component 104, header component 106, append component 108, and/or other computer program components. In some implementations, machine-readable instructions 100 may include transmission component 110 and/or other computer program components.

Access component 102 may be configured to access electronic information 20 and/or other information. Electronic information 20 may be stored in storage medium 12 and/or in other locations. Electronic information 20 may define visual content within video frames for playback. Visual content may refer to media content that may be observed visually. Visual content may include one or more videos stored in one or more formats/container, and/or other visual content. A video may include a video clip captured by a video capture device, multiple video clips captured by a video capture device, and/or multiple video clips captured by separate video capture devices. A video may include multiple video clips captured at the same time and/or multiple video clips captured at different times. A video may include a video clip processed by a video application, multiple video clips processed by a video application and/or multiple video clips processed by separate video applications.

Figure 3:
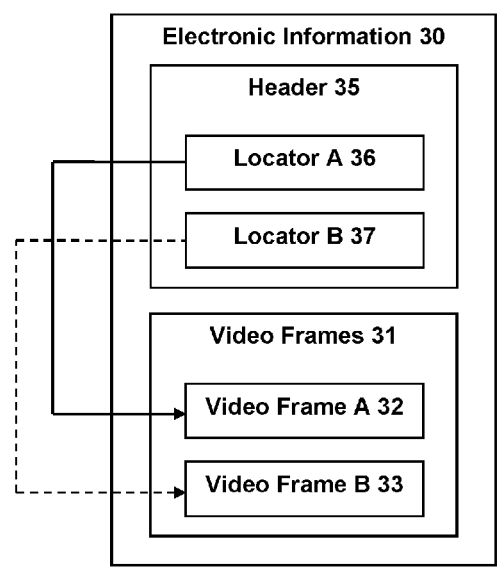
FIG. 3 illustrates an example of electronic information defining visual content within video frames.

For example, FIG. 3 illustrates exemplary electronic information 30. Electronic information 30 may include video frames 31. Video frames 31 may include video frame A 32, video frame B 33, and/or other video frames. Electronic information 30 may include header 35. Header 35 may include one or more locators indicating locations of one or more video frames 31 in electronic information 30. Header 35 may include locator A 36 indicating location of video frame A 32 in electronic information 30, locator B 37 indicating location of video frame B 33 in electronic information 30, and/or other locators indicating locations of other video frames in electronic information 30. One or more locators may be organized within one or more tables in electronic information 30/header 35.

Figure 4A:
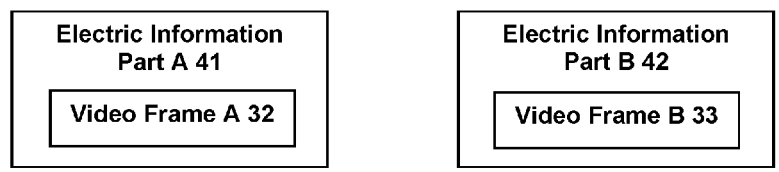
FIGS. 4A-4B illustrate examples of electronic information parts.

Divide component 104 may be configured to divide electronic information into two or more electronic information parts. The electronic information parts may define separate temporal segments of the visual content. For example, FIG. 4A illustrates exemplary electronic information part A 41 and electronic information part B 42. Electronic information part A 41 and electronic information part B 42 may define separate temporal segments of the visual content. For example, electronic information from which electronic information part A 41 and electronic information part B 42 are divided may define visual content captured during one or more capture time intervals. Electronic information part A 41 may define visual content captured during the first half of the capture time interval(s). Electronic information part B 42 may define visual content captured during the second half of the capture time interval(s). Other temporal divisions of the visual content captured during capture time interval(s) are contemplated.

For example, electronic information part A 41, electronic information part B 42, and/or other electronic information parts may be divided from electronic information 30 (shown in FIG. 3). Electronic information part A 41 may include video frame A 32 and/or other video frames. Electronic information part B 42 may include video frame B 33 and/or other video frames.

In some implementations, the electronic information may be divided into two or more electronic information parts based on instantaneous decoding refresh frames such that individual electronic information parts include individual instantaneous decoding refresh frames. An instantaneous decoding refresh (IDR) frame may include a video frame specifying that video frames following the IDR frame do not refer to video frames preceding the IDR frame.

Figure 5A:
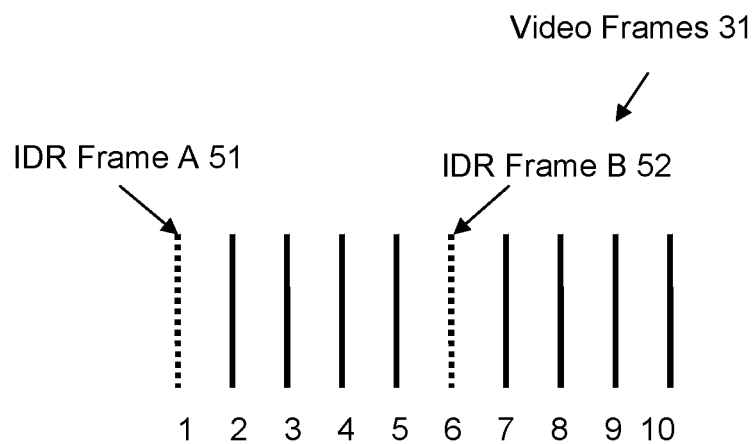
FIG. 5A illustrates an example of video frames.

For example, FIG. 5A illustrates exemplary video frames 31. Video frames 31 may include video frames #1-10 and/or other video frames. Video frames 31 may include IDR frame A 51 (video frame #1), IDR frame B 52 (video frame #6), and/or other IDR frames. Electronic information part A 41 may include video frames #1-5, including IDR frame A 51. Electronic information part B 42 may include video frames #6-10, including IDR frame B 52. In some implementations, one or more electronic information parts may include one or more instantaneous decoding refresh group. An IDR group may refer to a group of video frames including an IDR frame and one or more video frames that may do not refer to video frames preceding the IDR frame. For example, electronic information part A 41 may include an IDR group composed of video frames #1-5. Electronic information part B 42 may include an IDR group composed of video frames #6-10.

Figure 5B:
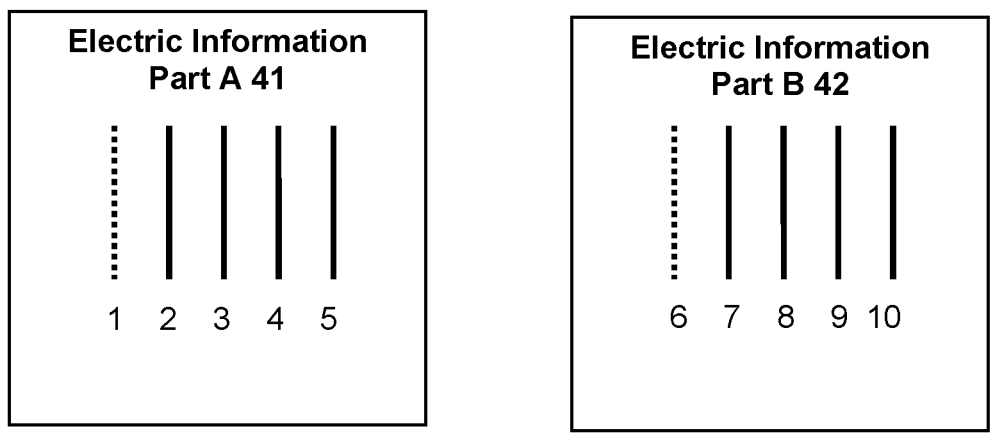
FIG. 5B illustrates examples of video frames in electronic information parts.

In some implementations, different instantaneous decoding refresh group may include a same number of video frames. For example, in FIG. 5B, both electronic information part A 41 and electronic information part B 42 may include the same number of video frames (e.g., five video frames, etc.). In some implementations, different instantaneous decoding refresh group may include different numbers of video frames. For example, two instantaneous decoding refresh groups may include different numbers of video frames (e.g., five video frames and seven video frames, etc.).

In some implementations, individual instantaneous decoding refresh group may include different sets of video frames. For example, in FIG. 5B, an IDR group in electronic information part A 41 may include a set of video frames including video frames #1-5, and an IDR group in electronic information part B 42 may include a set of video frames including video frames #6-10. The set of video frames in electronic information part A 41 may not refer to video frames preceding IDR frame A 51. The set of video frames in electronic information part B 42 may not refer to video frames preceding IDR frame B 52.

Figure 4B:
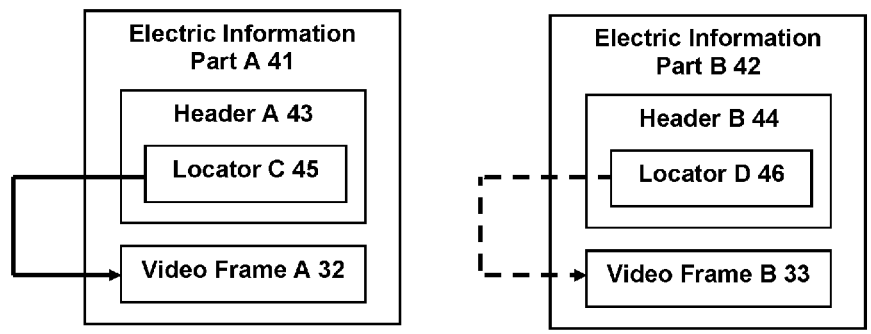

Header component 106 may be configured to generate headers for the electronic information parts. The headers may include locators indicating locations of video frames in the electronic information parts and/or other information. For example, as shown in FIG. 4B, header component 106 may generate header A 43 for electronic information part A 41 and header B 44 for electronic information part B 42. Header A 43 may include locator C 45 indicating location of video frame A 32 in electronic information part A 41 and/or other locators indicating locations of other video frames in electronic information part A 41. Header B 44 may include locator D 46 indicating location of video frame B 33 in electronic information part B 42 and/or other locators indicating locations of other video frames in electronic information part B 42.

In some implementations, one or more locators may include one or more file offsets. A file offset may indicate a distance to a location of a video frame from another location. For example, a file offset may indicate a number of bytes to a location of a video frame from the beginning of the electronic information part containing the video frame. For example, locator C 45 of header A 43 may include a file offset indicating location of video frame A 32 in electronic information part A 41. Locator D 46 of header B 44 may include a file offset indicating location of video frame B 33 in electronic information part B 42. Other types of locators are contemplated.

Append component 108 may be configured to append the headers to the electronic information parts. For example, as shown in FIG. 4B, header A 43 may be appended to electronic information part A 41. Header B 44 may be appended to electronic information part B 42. One or more headers may be appended to the beginning of electronic information parts, the end of electronic information parts, and/or other portions in electronic information parts. For example, header A 43 and/or header 44 may be appended to the beginning, the end, or other portions of electronic information part A 41 and electronic information part B 42, respectively.

Transmission component 110 may be configured to effectuate transmission of one or more electronic information parts. One or more electronic information parts may be transmitted to one or more client computing platforms and/or other computing devices. Client computing platforms may refer to computing devices that generate, process, and/or communicate electronic information. One or more client computing platforms may be associated with one or more users.

Figure 6A:
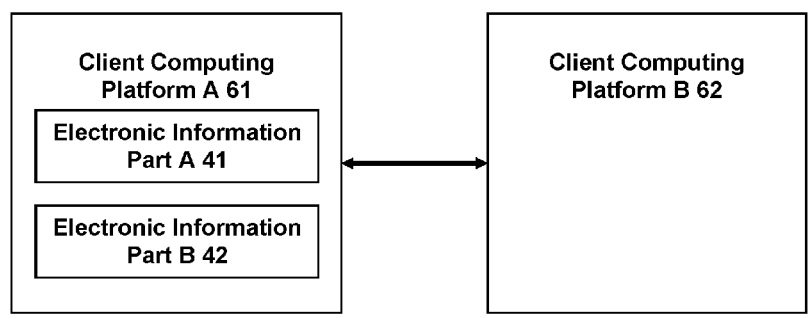
FIG. 6A illustrates examples of client computing platforms.

For example, FIG. 6A illustrates an exemplary connection between client computing platforms. Client computing platform A 61 may be connected to client computing platform B 62 and/or other client computing platforms. The connection(s) between client computing platforms may be direct (e.g., wired, wireless, etc.) and/or indirect (through a network, a server, another client computing platform, etc.). Client computing platform A 61 may be associated with one or more users and client computing platform B 62 may be associated with the user(s) or different user(s). Transmission component 110 may effectuate transmission of electronic information part A 41, electronic information part B 42, and/or other electronic information parts from client computing platform A 61 to client computing platform B 62 and/or other client computing platforms.

Figure 6B:
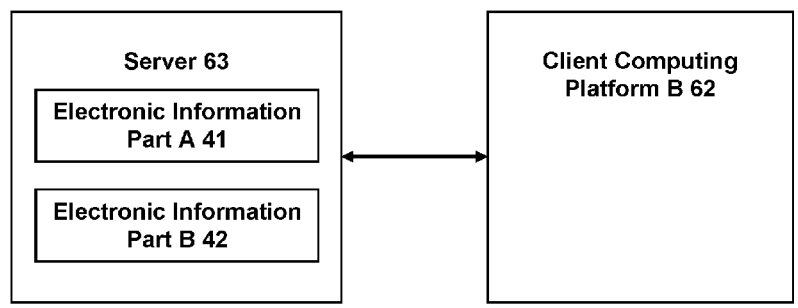
FIG. 6B illustrates examples of a server and a client computing platform.

FIG. 6B illustrates an exemplary connection between a server and a client computing platform. Server 63 may be connected to client computing platform B 62 and/or other client computing platforms. The connection(s) between server 63 and client computing platform B 62 may be direct (e.g., wired, wireless, etc.) and/or indirect (through a network, another server, another client computing platform, etc.). Client computing platform B 62 may be associated with one or more users. Transmission component 110 may effectuate transmission of electronic information part A 41, electronic information part B 42, and/or other electronic information parts from server 63 to client computing platform B 62 and/or other client computing platforms. In some implementations, one or more electronic information parts may be transmitted to one or more servers.

Transmission component 110 may effectuate transmission of one or more electronic information parts based on one or more user commands. One or more user commands may be received from a client computing platform that receives the electronic information part and/or from other client computing platforms. For example, one or more user commands (e.g., a user command requesting receipt of electronic information parts, etc.) may be received by client computing platform A 61 and/or server 63 from client computing platform B 62. One or more user commands (e.g., a user command requesting sending of electronic information parts, etc.) may be received at client computing platform A 61 or server 63. For examples, a user of client computing platform A 61 or server 63 may provide a user command requesting sending of one or more electronic information parts. One or more user commands may be received at client computing platform A 61 or server 63 from another client computing platform or server. For example, another client computing platform may be connected to server 63, and server 63 may receive from the other client computing platform a request to send one or more electronic information parts to client computing platform B 62.

For example, transmission component 110 may, responsive to a particular user command or user commands, effectuate transmission of electronic information part A 41 and/or other electronic information parts to a client computing platform associated with a user (e.g., client computing platform B 62, etc.). Electronic information part A 41 may be transmitted at a first time. Transmission component 110 may, responsive to another user command or user commands, effectuate transmission of electronic information part B 42 and/or other electronic information parts to the client computing platform associated with the user (e.g., client computing platform B 62, etc.). Electronic information part B 42 may be transmitted at a second time. The second time may be subsequent to the first time. In some implementations, electronic information part A 41, electronic information part B 42, and/or other electronic information parts may be transmitted to a client computing platform at the same time and/or in response to the same user command(s).

In some aspects of the disclosure, as shown in FIG. 1B, machine-readable instructions 100 may include one or more of receive component 112, combine component 114, and/or other computer program components. In some implementations, machine-readable instructions 100 may include remove component 116, and/or other computer program components.

Figure 7:
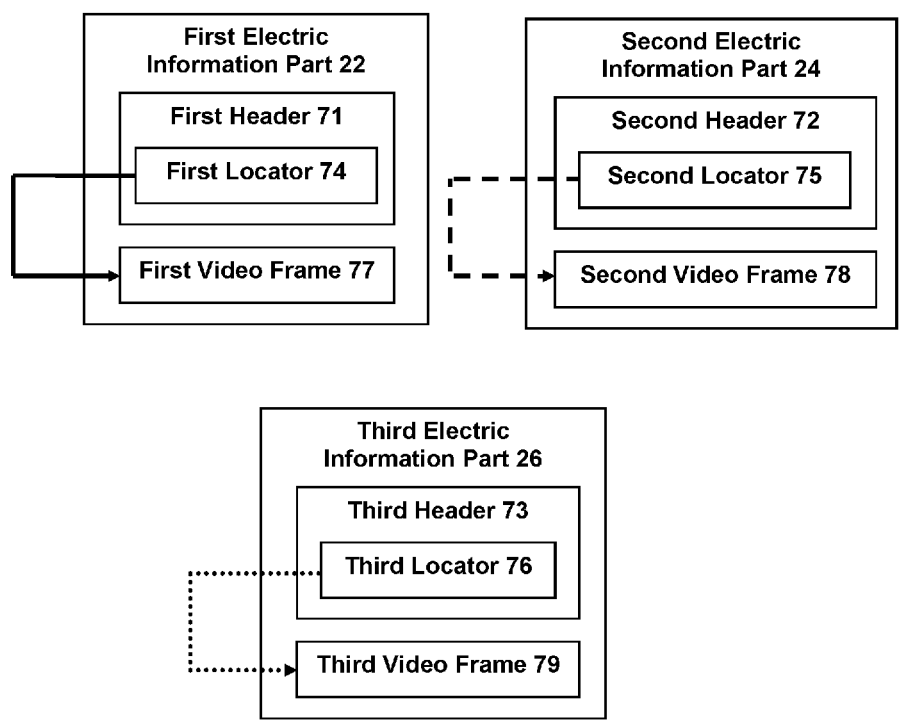
FIG. 7 illustrates examples of electronic information parts.

Receive component 112 may be configured to receive one or more electronic information parts and/or other information. The electronic information parts may define separate temporal segments of visual content within video frames for playback. For example, storage medium 12 of system 10B may include first electronic information part 22, second electronic information part 24, and/or other electronic information parts received by receive component 112. In some implementations, the electronic information parts received by receive component 112 may include third electronic information part 26. First electronic information part 22, second electronic information part 24, and third electronic information part 26 may define separate temporal segments of visual content captured during one or more capture time intervals. As shown in FIG. 7, first electronic information part 22 may include first video frame 77 and/or other video frames. Second electronic information part 24 may include second video frame 78 and/or other video frames. Third electronic information part 26 may include third video frame 79 and/or other video frames.

The electronic information parts may include headers. The header may include locators indicating locations of video frames in the electronic information parts and/or other information. First electronic information part 22 may include first header 71. First header 71 may include first locator 74 indicating location of first video frame 77 in first electronic information part 22 and/or other locators indicating locations of other video frames in first electronic information part 22. Second electronic information part 24 may include second header 72. Second header 72 may include second locator 75 indicating location of second video frame 78 in second electronic information part 24 and/or other locators indicating locations of other video frames in second electronic information part 24. In some implementations, third electronic information part 26 may include third header 73. Third header 73 may include third locator 76 indicating location of third video frame 79 in third electronic information part 26 and/or other locators indicating locations of other video frames in third electronic information part 26. In some implementations, one or more locators may include one or more file offsets.

The electronic information parts may be divided from electronic information stored in a storage medium (e.g., from electronic information 20 stored in storage medium 12 of FIG. 1A, etc.). Electronic information may be divided as explained above with respect to divide component 104. The electronic information parts may be divided from electronic information based on IDR frames such that individual electronic information parts include individual IDR frames. For example, first electronic information part 22 may include a first IDR frame. Second electronic information part 24 may include a second IDR frame. Third electronic information part 26 may include a third IDR frame. In some implementations, first electronic information part 22 may include a first IDR group. Second electronic information part 24 may include a second IDR group. Third electronic information part 26 may include a third IDR group.

In some implementations, different IDR group may include a same number of video frames. For example, the first IDR group, the second IDR group, and/or the third IDR group may include a same number of video frames. In some implementations, different IDR group may include different numbers of video frames. For example, the first IDR group, the second IDR group, and/or the third IDR group may include different numbers of video frames.

In some implementations, receive component 112 may receive one or more electronic information parts at different times. For example, one or more of first electronic information part 22, second electronic information part 24, third electronic information part 26, and/or other electronic information parts may be received at a first time while other(s) may be received at a second time. The second time may be subsequent to the first time. In some implementations, one or more electronic information parts may be received in response to one or more user commands. For example, first electronic information part 22 and/or other electronic information parts may be received in response to a first user command. Second electronic information part 24 and/or other electronic information parts may be received in response to a second user command. In some implementations, third electronic information part 26 and/or other electronic information parts may be received at a third time. The third time may be subsequent to the second time. One or more of the received electronic information parts may be stored in storage medium 12 and/or other locations.

Figure 8:
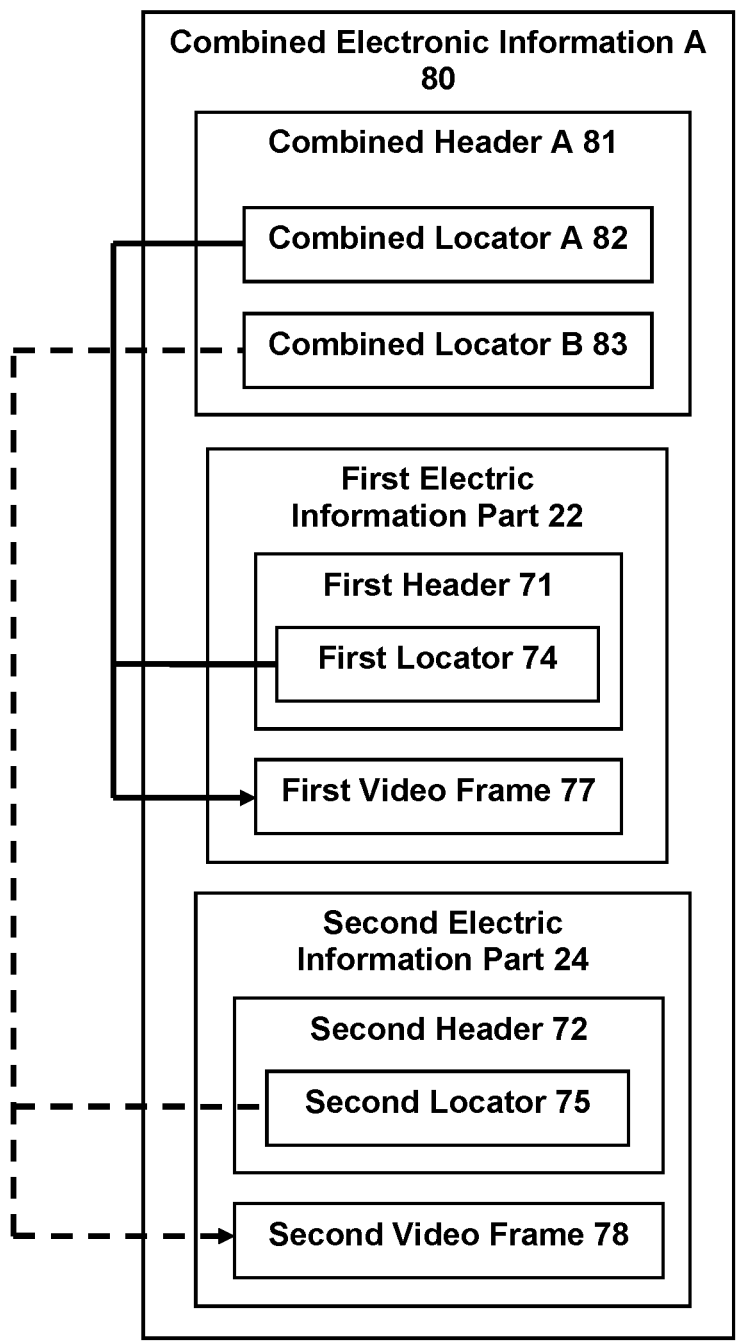
FIGS. 8-9 illustrate examples of combined electronic information.

Combine component 114 may be configured to generate one or more combined electronic information. Combined electronic information may include multiple electronic information parts. For example, combine component 114 may generate combined electronic information A 80, shown in FIG. 8. Combined electronic information A 80 may include first electronic information part 22, second electronic information part 24, and/or other electronic information parts.

The combined electronic information A 80 may include combined header A 81. Combined header A 81 may include locators indicating locations of video frames in combined electronic information A 80. Combined header A 81 may include combined locator A 82 indicating location of first video frame 77 in combined electronic information A 80, combined locator B 83 indicating location of second video frame 78 in combined electronic information A 80, and/or other locators indicating locations of other video frames in combined electronic information A 80.

Figure 9:
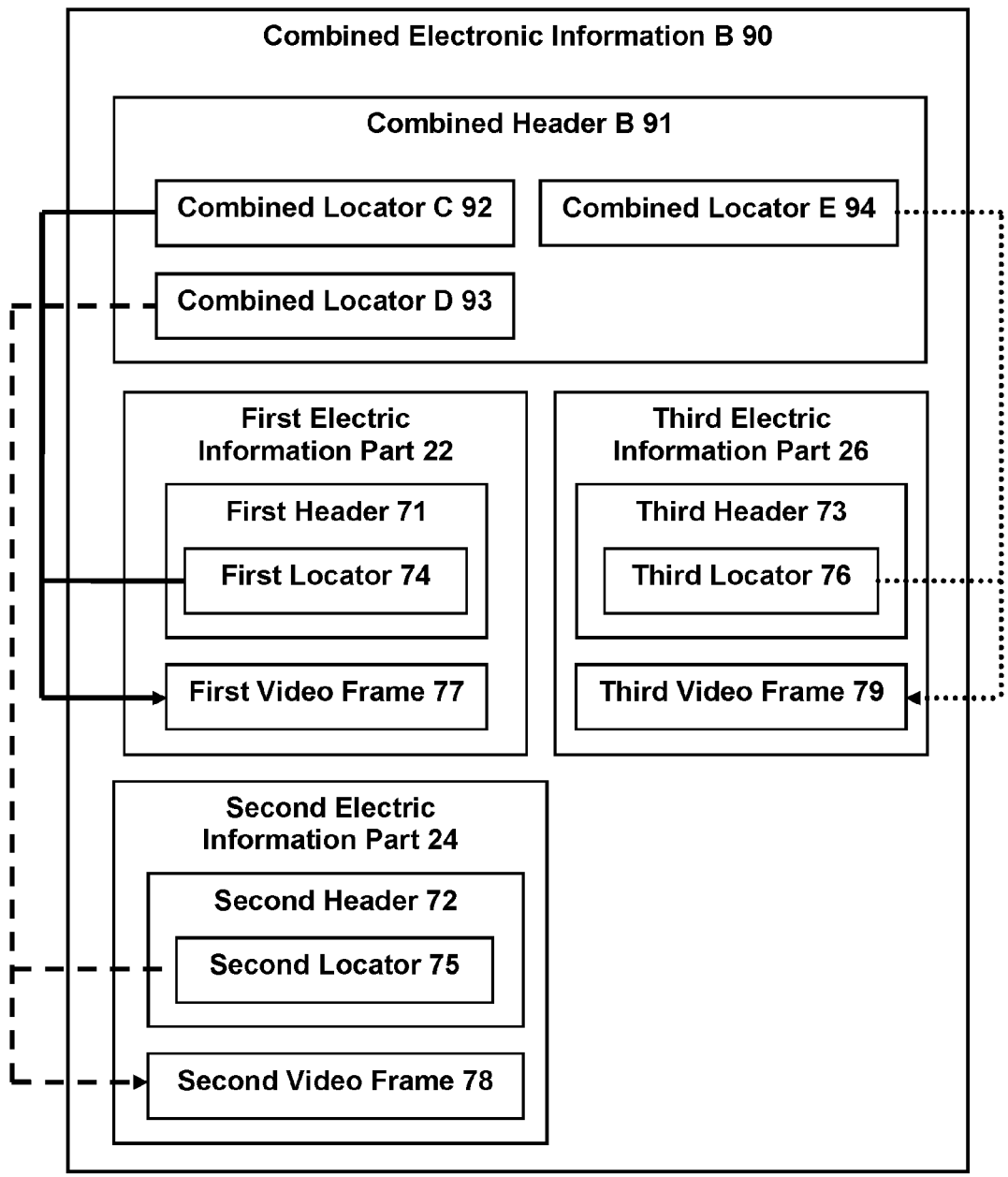

Combine component 114 may generate combined electronic information B 90, as shown in FIG. 9. Combined electronic information B 90 may be generated by combine component 114 after combine component 114 has generated combined electronic information A 80. Combine component 114 may generate combined electronic information A 80 after receive component 112 has received first electronic information part 22, second electronic information part 24, and/or other electronic information parts. Combine component 114 may generate combined electronic information B 90 after receive component 112 has received first electronic information part 22, second electronic information part 24, third electronic information part 26, and/or other electronic information parts.

Combined electronic information B 90 may include first electronic information part 22, second electronic information part 24, third electronic information part 26, and/or other electronic information parts. Combined electronic information B 90 may include combined header B 91. Combined header B 91 may include locators indicating locations of video frames in combined electronic information B 90. Combined header B 91 may include combined locator C 92 indicating location of first video frame 77 in combined electronic information B 90, combined locator D 93 indicating location of second video frame 78 in combined electronic information B 90, combined locator E 94 indicating location of third video frame 79 in combined electronic information B 90, and/or other locators indicating locations of other video frames in combined electronic information B 90.

In some implementations, combined electronic information B 90 may not include combined header A 81. In some implementations, combined header B 91 may be created by modifying combined header A 81. In some implementations, combined header B 91 may be created without reference to combined header A 81. In some implementations, combined electronic information B 90 may replace combined electronic information A 80. In some implementations, storage medium 12 may include both combined electronic information A 80 and combined electronic information B 90.

The use of combine component 114 to combine multiple electronic information parts and the use of locators in headers to indicate locations of video frames in the combined electronic information may allow a user/system to combine multiple electronic information parts defining visual content within video frames into the combined electronic information without re-rendering of the video frames. For example, in some implementations where locators include file offsets, combine component 114 may combine multiple electronic information parts into the combined electronic information and the values of file offsets in the header may be set/adjusted to indicate locations within the combined electronic information corresponding to individual video frames.

Remove component 116 may be configured to remove one or more electronic information parts from one or more combined electronic information. For example, remove component 116 may remove one or more electronic information parts from combined electronic information B 90 and/or other combined electronic information. For example, remove component 116 may remove third electronic information part 26 and/or other electronic information parts from combined electronic information B 90 and generate combined electronic information A 80.

Remove component 116 may modify combined header B 91. Combined header B 91 may be modified to remove one or more locators (e.g., combined locator E 94, etc.) corresponding to the removed electronic information parts (e.g., third electronic information part 26, etc.). In some implementations, a new header may be generated for the modified combined electronic information without reference to combined header B 91. In some implementation, the modified combined electronic information may replace the original combined electronic information (e.g., combined electronic information B 90, etc.). In some implementations, storage medium 12 may include both the original combined electronic information (e.g., combined electronic information B 90, etc.) and the modified combined electronic information (e.g., combined electronic information A 80, etc.).

The use of remove component 116 to remove one or more electronic information parts from the combined electronic information and the use of locators in headers to indicate locations of video frames in the modified combined electronic information may allow a user/system to remove one or more electronic information parts defining visual content within video frames from the combined electronic information without re-rendering of the video frames. For example, in some implementations where locators include file offsets, remove component 116 may remove one or more electronic information parts from the combined electronic information and the values of file offsets may be removed/adjusted to indicate the locations within the modified combined electronic information corresponding to individual video frames.

While different computer program components are shown to be located within machine-readable instruction 100 in FIGS. 1A and 1B, this is merely for ease of reference and is not limiting. For example, some or all of computer program components 102, 104, 106, 108, 110, 112, 114, and 116 may be located in machine-readable instructions 100 of a single system.

While the present disclosure may be directed to videos, one or more other implementations of the system may be configured for other types media content. Other types of media content may include one or more of audio content (e.g., music, podcasts, audio books, and/or other audio content), multimedia presentations, photos, slideshows, and/or other media content.

Although processor 11 and storage medium 12 are shown to be connected to an interface 13 in FIGS. 1A-1B, any communication medium may be used to facilitate interaction between any components of systems 10A-10B. One or more components of systems 10A-10B may communicate with each other through hard-wired communication, wireless communication, or both. For example, one or more components of systems 10A-10B may communicate with each other through a network. For example, processor 11 may wirelessly communicate with storage medium 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIGS. 1A-1B as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIGS. 1A-1B as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, 110, 112, 114, and/or 116 may be eliminated, and some or all of its functionality may be provided by other computer program components. As another example, processor 11 may be configured to execute one or more additional computer program components that may perform some or all of the functionality attributed to one or more of computer program components 102, 104, 106, 108, 110, 112, 114, and/or 116 described herein.

The electronic storage media of storage medium 12 may be provided integrally (i.e., substantially non-removable) with one or more components of systems 10A-10B and/or removable storage that is connectable to one or more components of systems 10A-10B via, for example, a port (e.g., a USB port, a Firewire port, etc.) or a drive (e.g., a disk drive, etc.). Storage medium 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Storage medium 12 may be a separate component within systems 10A-10B, or storage medium 12 may be provided integrally with one or more other components of systems 10A-10B (e.g., processor 11). Although storage medium 12 is shown in FIGS. 1A-1B as a single entity, this is for illustrative purposes only. In some implementations, storage medium 12 may comprise a plurality of storage units. These storage units may be physically located within the same device, or storage medium 12 may represent storage functionality of a plurality of devices operating in coordination.

Figure 2A:
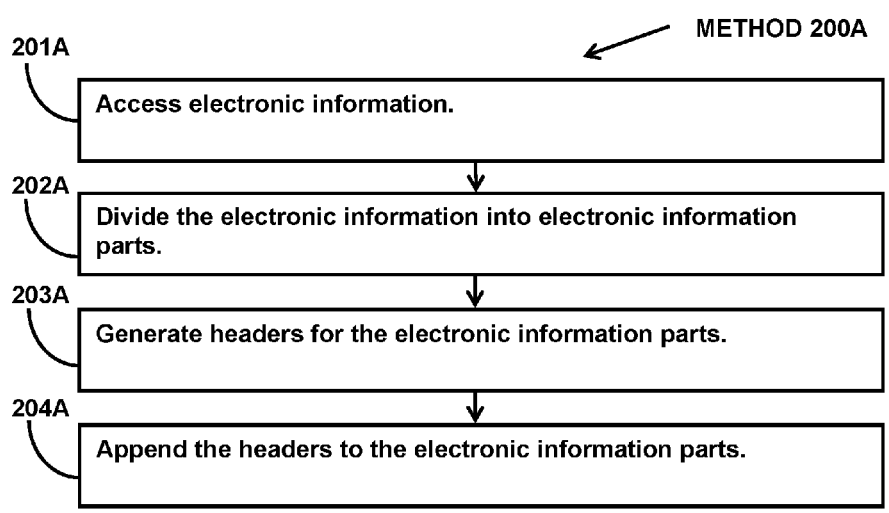
FIGS. 2A-2B illustrate methods for organizing video files.
Figure 2B:
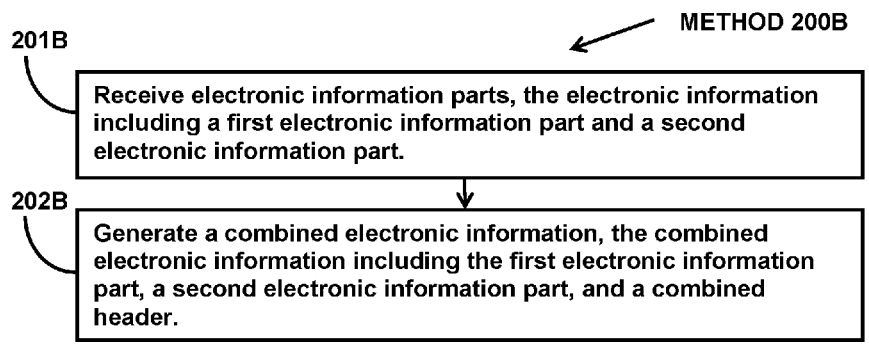

FIGS. 2A-2B illustrate methods 200A-200B for organizing video files. The operations of methods 200A-200B presented below are intended to be illustrative. In some implementations, methods 200A-200B may be accomplished with one or more additional operations not described, and/or without one or more of the operations discussed. In some implementations, two or more of the operations may occur substantially simultaneously.

In some implementations, methods 200A-200B may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of methods 200A-200B in response to instructions stored electronically on one or more electronic storage mediums. The one or more processing devices may include one or more devices configured through hardware, firmware, and/or software to be specifically designed for execution of one or more of the operations of methods 200A-200B.

Referring to FIG. 2A and method 200A, at operation 201A, electronic information may be accessed. The electronic information may be stored in a storage medium and/or other locations. The electronic information may define visual content within video frames for playback. In some implementations, operation 201A may be performed by a processor component the same as or similar to access component 102 (shown in FIG. 1A and described herein).

At operation 202A, the electronic information may be divided into electronic information parts. The electronic information parts may define separate temporal segments of the visual content. The electronic information parts may include a first electronic information part and a second electronic information part. The first electronic information part may include a first video frame and the second electronic information part may include a second video frame. In some implementations, operation 202A may be performed by a processor component the same as or similar to divide component 104 (shown in FIG. 1A and described herein).

At operation 203A, headers may be generated for the electronic information parts. The headers may include locators indicating locations of video frames in the electronic information parts. A first header may include a locator indicating location of the first video frame in the first electronic information part. A second header may include a locator indicating location of the second video frame in the second electronic information part. In some implementations, operation 203A may be performed by a processor component the same as or similar to header component 106 (shown in FIG. 1A and described herein).

At operation 204A, the headers may be appended to the electronic information parts. The first header may be appended to the first electronic information part. The second header may be appended to the second electronic information part. In some implementations, operation 204A may be performed by a processor component the same as or similar to append component 108 (shown in FIG. 1A and described herein).

Referring to FIG. 2B and method 200B, at operation 201B, electronic information parts may be received. The electronic information parts may include a first electronic information part and a second electronic information part. The first electronic information part may include a first video frame and a first header. The first header may include a locator indicating location of the first video frame in the first electronic information part. The second electronic information part may include a second video frame and a second header. The second header may include a locator indicating location of the second video frame in the second electronic information part. In some implementations, operation 201B may be performed by a processor component the same as or similar to receive component 112 (shown in FIG. 1B and described herein).

At operation 202B, a combined electronic information may be generated. The combined electronic information may include the first electronic information part, the second electronic information part, and a combined header. The combined header may include a locator indicating location of the first video frame in the combined electronic information and a locator indicating location of the second video frame in the combined electronic information. In some implementations, operation 202B may be performed by a processor component the same as or similar to combine component 114 (shown in FIG. 1B and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for organizing video files, the system comprising:
   one or more physical processors configured by machine-readable instructions to:
   receive electronic information parts, the electronic information parts defining separate temporal segments of visual content within video frames for playback, the electronic information parts including a first electronic information part and a second electronic information part,
   wherein the first electronic information part includes a first video frame and a first header including a first locator indicating location of the first video frame in the first electronic information part and the second electronic information part includes a second video frame and a second header including a second locator indicating location of the second video frame in the second electronic information part,
   wherein the first electronic information part is received at a first time and the second electronic information part is received at a second time that is subsequent to the first time,
   wherein the electronic information parts include a third electronic information part received at a third time that is subsequent to the second time, the third electronic information part including a third video frame and a third header including a third locator indicating location of the third video frame in the third electronic information part;
   generate a first combined electronic information, the first combined electronic information including the first electronic information part and the second electronic information part and a first combined header, wherein the first combined header includes a first combined locator indicating location of the first video frame in the first combined electronic information and a second combined locator indicating location of the second video frame in the first combined electronic information; and
   generate a second combined electronic information, the second combined electronic information including the first electronic information part, the second electronic information part, the third electronic information part, and a second combined header, wherein the second combined header includes a third combined locator indicating location of the first video frame in the second combined electronic information, a fourth combined locator indicating location of the second video frame in the second combined electronic information, and a fifth combined locator indicating location of the third video frame in the second combined electronic information.

2. The system of claim 1, wherein the second combined electronic information does not include the first combined header.

3. The system of claim 1, wherein the one or more physical processors are further configured by machine-readable instructions to:
   remove one or more of the electronic information parts from the second combined electronic information; and
   modify the second combined header to remove one or more locators corresponding to the one or more removed electronic information parts.

4. The system of claim 1, wherein the first electronic information part is received in response to a first user command and the second electronic information part is received in response to a second user command.

5. The system of claim 1, wherein the electronic information parts are divided from electronic information stored in a storage medium based on instantaneous decoding refresh frames such that individual electronic information parts include individual instantaneous decoding refresh frames, the first electronic information part including a first instantaneous decoding refresh frame and the second electronic information part including a second instantaneous decoding refresh frame.

6. The system of claim 5, wherein the first electronic information part includes a first instantaneous decoding refresh group and the second electronic information part includes a second instantaneous decoding refresh group.

7. The system of claim 6, wherein the first instantaneous decoding refresh group and the second instantaneous decoding refresh group includes a same number of video frames.

8. The system of claim 6, wherein the first instantaneous decoding refresh group and the second instantaneous decoding refresh group includes different numbers of video frames.

9. The system of claim 1, wherein the locators include file offsets.

10. A method for organizing video files, the method performed by a computing system including one or more physical processors, the method comprising:
    receiving, by the computing system, electronic information parts, the electronic information parts defining separate temporal segments of visual content within video frames for playback, the electronic information parts including a first electronic information part and a second electronic information part, wherein the first electronic information part includes a first video frame and a first header including a first locator indicating location of the first video frame in the first electronic information part and the second electronic information part includes a second video frame and a second header including a second locator indicating location of the second video frame in the second electronic information part, wherein the first electronic information part is received at a first time and the second electronic information part is received at a second time that is subsequent to the first time, wherein the electronic information parts include a third electronic information part received at a third time that is subsequent to the second time, the third electronic information part including a third video frame and a third header including a third locator indicating location of the third video frame in the third electronic information part;

generating, by the computing system, a first combined electronic information, the first combined electronic information including the first electronic information part and the second electronic information part and a first combined header, wherein the first combined header includes a first combined locator indicating location of the first video frame in the first combined electronic information and a second combined locator indicating location of the second video frame in the first combined electronic information; and generating, by the computing system, a second combined electronic information, the second combined electronic information including the first electronic information part, the second electronic information part, the third electronic information part, and a second combined header, wherein the second combined header includes a third combined locator indicating location of the first video frame in the second combined electronic information, a fourth combined locator indicating location of the second video frame in the second combined electronic information, and a fifth combined locator indicating location of the third video frame in the second combined electronic information.

11. The method of claim 10, wherein the second combined electronic information does not include the first combined header.

12. The method of claim 10, further comprising:
removing, by the computing system, one or more of the electronic information parts from the second combined electronic information; and
modifying, by the commuting system, the second combined header to remove one or more locators corresponding to the one or more removed electronic information parts.

13. The method of claim 10, wherein the first electronic information part is received in response to a first user command and the second electronic information part is received in response to a second user command.

14. The method of claim 10, wherein the electronic information parts are divided from electronic information stored in a storage medium based on instantaneous decoding refresh frames such that individual electronic information parts include individual instantaneous decoding refresh frames, the first electronic information part including a first instantaneous decoding refresh frame and the second electronic information part including a second instantaneous decoding refresh frame.

15. The method of claim 14, wherein the first electronic information part includes a first instantaneous decoding refresh group and the second electronic information part includes a second instantaneous decoding refresh group.

16. The method of claim 15, wherein the first instantaneous decoding refresh group and the second instantaneous decoding refresh group includes a same number of video frames.

17. The method of claim 15, wherein the first instantaneous decoding refresh group and the second instantaneous decoding refresh group includes different numbers of video frames.

18. The method of claim 10, wherein the locators include file offsets.

* * * * *